US008417376B1

(12) United States Patent
Smolen

(10) Patent No.: US 8,417,376 B1
(45) Date of Patent: Apr. 9, 2013

(54) METHOD AND MEANS FOR VIEWING SELECTING AND TAKING ACTION RELATIVE TO AN ITEM OF A GROUP OF ITEMS

(76) Inventor: Christopher M. Smolen, Oneida, NY (US)

( * ) Notice: Subject to any disclaimer, the term of this patent is extended or adjusted under 35 U.S.C. 154(b) by 253 days.

(21) Appl. No.: 13/015,792

(22) Filed: Jan. 28, 2011

(51) Int. Cl.
*G06F 17/00* (2006.01)

(52) U.S. Cl.
USPC ............................ 700/232; 700/231; 221/155

(58) Field of Classification Search .................. 700/231, 700/232; 221/9, 155
See application file for complete search history.

(56) References Cited

U.S. PATENT DOCUMENTS

| | | | | |
|---|---|---|---|---|
| 5,553,736 | A * | 9/1996 | Healis | 221/62 |
| 5,831,862 | A * | 11/1998 | Hetrick et al. | 700/232 |
| 5,951,397 | A | 9/1999 | Dickinson | |
| 7,490,054 | B2 | 2/2009 | Reade | |
| 7,783,381 | B2 * | 8/2010 | Walker et al. | 700/240 |
| 7,881,822 | B2 * | 2/2011 | Thornton et al. | 700/244 |
| 7,978,184 | B2 * | 7/2011 | Morrison | 345/173 |
| 8,170,713 | B2 * | 5/2012 | Levasseur et al. | 700/232 |
| 8,283,680 | B2 * | 10/2012 | Repetto et al. | 257/88 |
| 2010/0184485 | A1 * | 7/2010 | Kim | 345/156 |
| 2010/0309150 | A1 * | 12/2010 | Lee et al. | 345/173 |
| 2012/0098761 | A1 * | 4/2012 | Mitchell et al. | 345/173 |

* cited by examiner

*Primary Examiner* — Timothy Waggoner
(74) *Attorney, Agent, or Firm* — Robert O. Wright

(57) ABSTRACT

A method and device utilizing touch screen transparent LED means is shown for viewing a number of products, selecting one or more for investigation by displaying information concerning the selected items, choosing one for removal from the display of items and delivering the chosen item to a user.

18 Claims, 7 Drawing Sheets

METHOD AND MEANS FOR VIEWING SELECTING AND TAKING ACTION RELATIVE TO AN ITEM OF A GROUP OF ITEMS

This invention relates to a method and apparatus for viewing items, obtaining pertinent information about one or more of selected items, and arranging for a physical activity relative to said one or more selected items. More particularly this invention relates to a method and apparatus for use in a selection environment where the user can confirm an exact item condition and content before initiating an action relative thereto. Typical selection environments might include Kiosks, ticket machines, photo printing, "build your own" sandwich, toy or the like selection and even assembly operations where real time observation and activity are required. Typical activity events might include payment and/or delivery of a selected item through physical action such as gesture recognition. a keypad, or visual such as scanning a document or watching progress of an assembly operation and selecting action to be taken. For simplicity and ease of understanding this invention a specific application will be described namely a vending machine in which a variety of items may be stored, displayed, information concerning each item retrieved and viewed, selection of an item for purchase made, payment arranged and delivery accomplished in a new and improved fashion. This application claims the benefit of U.S. Provisional Application No. 61/282,491 filed Feb. 19, 2010 and the content of said application is incorporated herein in full by reference.

BACKGROUND OF INVENTION

Vending machines for dispensing various food, cosmetic and sundry items have been available for many years in which a buyer inserted money in a slot, pushed a button to indicate the item selection and received the selected item in a slot at the bottom of the machine . More recently vending machines have displayed the offered items in a viewing area and in an adjacent computer display offered information about the products by actuating the appropriate button in a keypad type of input device before selection of an item for purchase. After reviewing the information such as nutritional, dietary, allergy, another keypad input would allow dispensing of the item after payment by cash, credit card, or other payment interface.

OBJECTS OF THE INVENTION

Accordingly it is a broad object of the present invention to provide a method and apparatus for visually observing an item or activity, learning information about the item or activity, selecting an item or activity for further consideration and securing performance of the selected consideration It is a further object of the present invention to combine visual observation and physical action at a given site in a more efficient and expeditious manner.

It is a still further object of the present invention to provide a vending machine for a variety of items that presents the products to be purchased, to the buyer, in a more effective manner and is simpler and easier to operate.

It is another object of the present invention to provide a vending machine for a variety of items that is more efficient to operate, displays each product more clearly to the buyer, and simplifies the steps the buyer must go through to accomplish the purchase.

It is yet a further object of the present invention to provide a vending machine that reduces the likelihood of error in the purchasing transaction by reducing the procedural steps the buyer must go through to learn the necessary information about the item and then to select and pay for the item..

These and other and further objects of the present invention are accomplished in part by a vending machine having a transparent touch screen display area for direct viewing of each item for sale combined with the necessary information furnishing and product dispensing action functions.

DESCRIPTION OF PREFERRED EMBODIMENT

Figure 1:
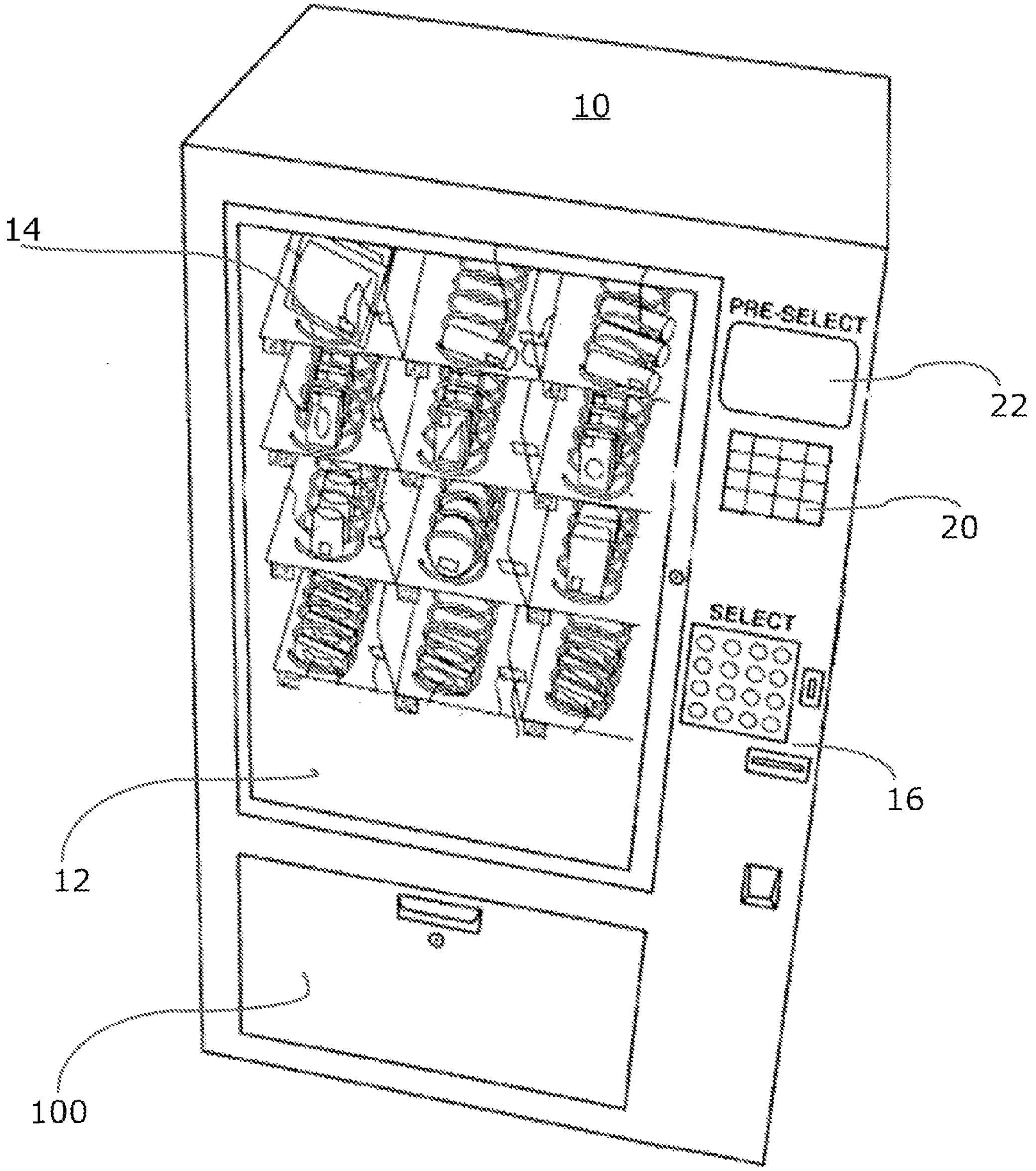
Figure 1 (Prior Art)
FIG. 1 is perspective view of a Prior Art vending machine.

Referring now to FIG. 1 there is shown a typical prior art vending machine 10 with display window 12 through which a potential purchaser may view the products 14 for sale. The products 14 are held in a series of rows and columns and upon selection by pressing a key in the keypad 16 and making payment through the slot just below pad 16 are dropped down into compartment 100. Frequently a pre-selection keypad 20 and display screen 22 allow the customer to receive information about a selected product before making the decision to buy with keypad 16.

Figure 2:
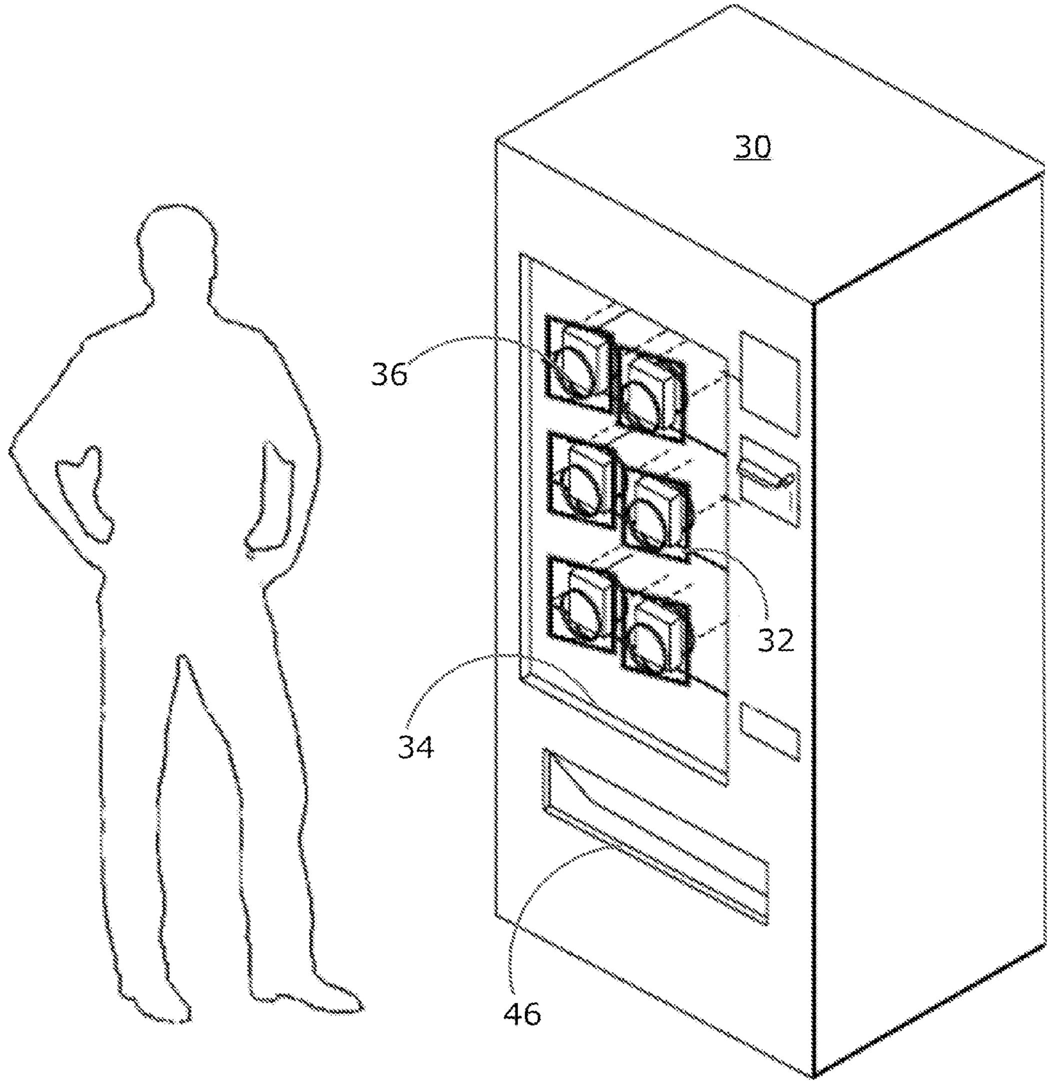
FIG. 2 is a view similar to FIG. 1 of a vending machine according to the present invention.

In FIG. 2 there is shown a simplified vending machine 30 according to the present invention. While for illustrative purposes I use herein a vending machine for food items (i.e. snack and drink) a vending machine according to the present invention could dispense a wide variety of items such as medicines, personal hygiene items, sundries, books and the like. Further this viewing and selection method and apparatus can be applied to a wide variety of investigation, selection, processing and action environments where the user can confirm an exact item condition and content before initiating an action relative thereto. Typical such environments include "build your own" sandwich, toy or the like selection and even assembly operations where real time observation and activity are required.

Figure 3:
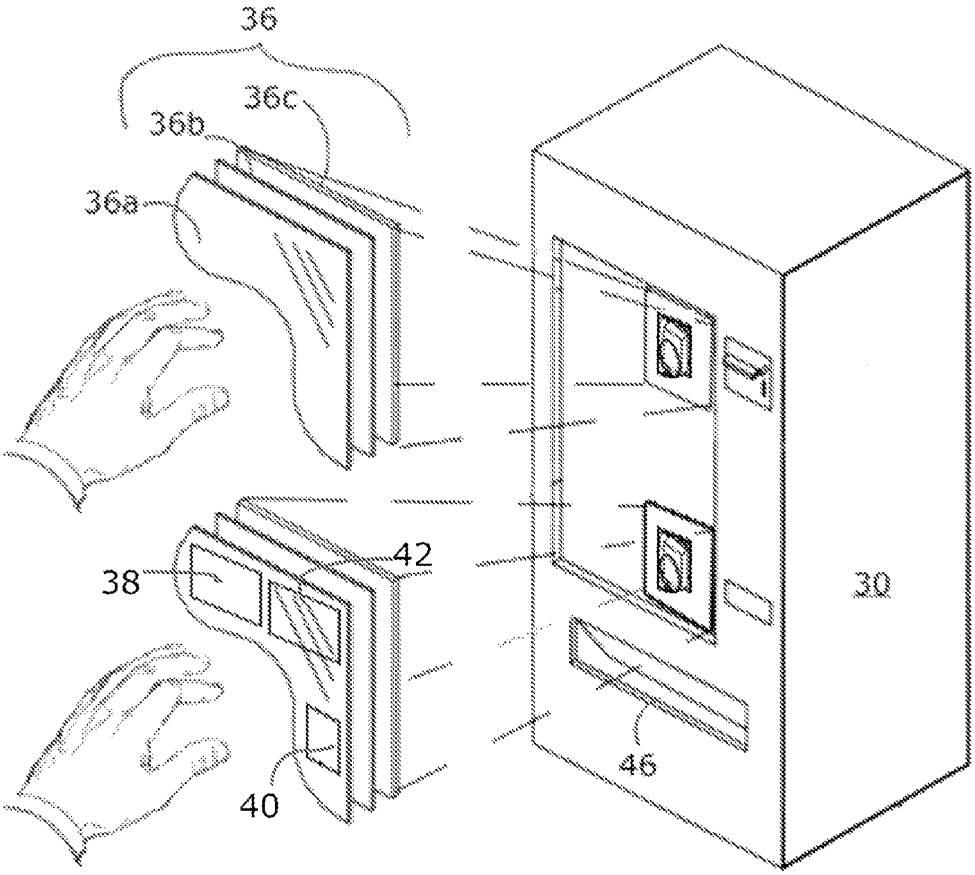
FIG. 3 is an exploded view of a transparent touch screen unit in the display area of FIG. 2.

In vending machine 30 food and drink products 32 are again stored in the usual rows and columns and are viewed through a display area window 34. Mounted on display window 34 are a series of transparent touch screen units 36 one for each displayed product. In FIG. 3 the units 36, shown in partially exploded form, each consist of display layer 36*c*, touch screen layer 36*b* and protective layer 36*a*. Each unit 36 provides a direct view of one product group in its row and column. Units 36 each have "information" and "selection" areas 38 & 40 respectively formed on each touch screen unit 36 to permit customer control of viewing the products, selecting which products to get more information about and initiating purchasing action directly while looking at a desired product. Touching the "info" area 38 will display the dietary or other product information for that particular product at 42 on the touch screen unit 36 for the customer's review concerning the product of interest. The product information and selection functions can thus be accomplished with minimum customer effort or distraction from multiple complicated operating devices and instructions.

Should the information displayed result in the product selected being unacceptable the customer need only move to the next unit 36 and associated viewable product without having to start over at a separate keypad location elsewhere on the vending machine thus retaining the efficient direct and compact operating ease of the transparent touch screen units 36.

As soon as the customer is satisfied with the product information displayed and decides to buy the product he merely touches the "select" area 40. The selection is noted in CPU 60 and the transparent touch screen then in display area 42 offers the customer payment options such as coin, pliant currency, credit card, or other payment method with suitable indicia displayed on the appropriate information display screen 42 as appropriate. The customer again with the transparent touch screen unit 36 using display screen 42 merely touches the preferred payment method of those offered and after the CPU 60 via payment input unit 68 verifies payment has been received the product is released to the compartment 46 in the machine 30.

All of this activity may of course be recorded and saved by the microcontroller 50 (see FIG. 5) for inventory control, preference survey, purchase activity or other purposes.

Figure 4:
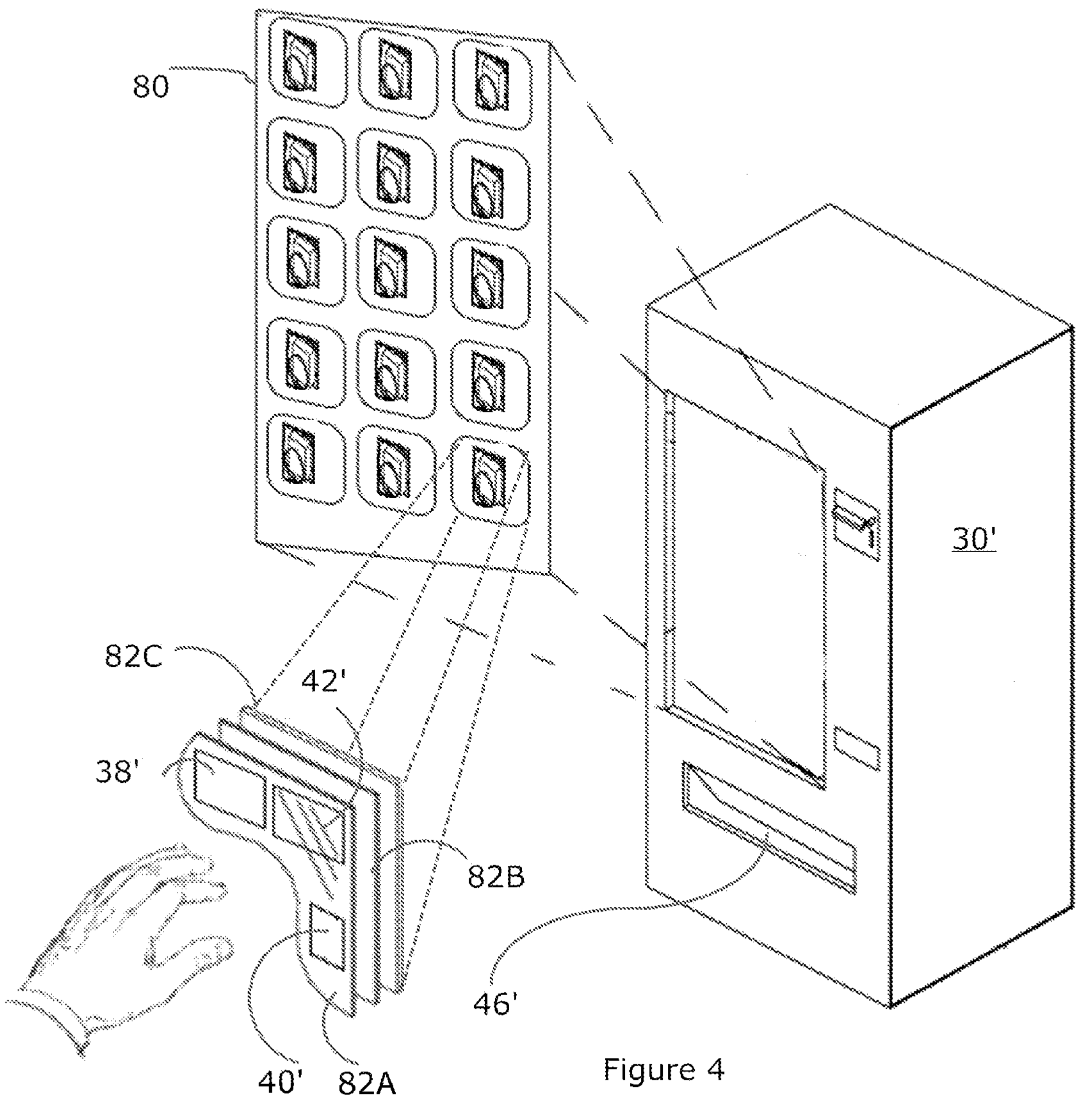
FIG. 4 is a view similar to FIG. 3 of the entire display area in transparent touch screen configuration.

Referring now to FIG. 4 the entire display window area 34 of FIG. 3 comprises a transparent touch screen 80. Typically this would include display layer 80*c*, touch screen layer 80*b* and protective layer 80*a*. Touch screen 80 would have indicated individual display areas 82 opposite each group of product to be dispensed with protective overlay indicating the viewing 42', information 38' and selection 40' areas for each item stocked in the vending machine similar to that shown in FIG. 3. Transparent touch screen units 36 and 80 may be OGLED or LED units as desired.

Figure 5:
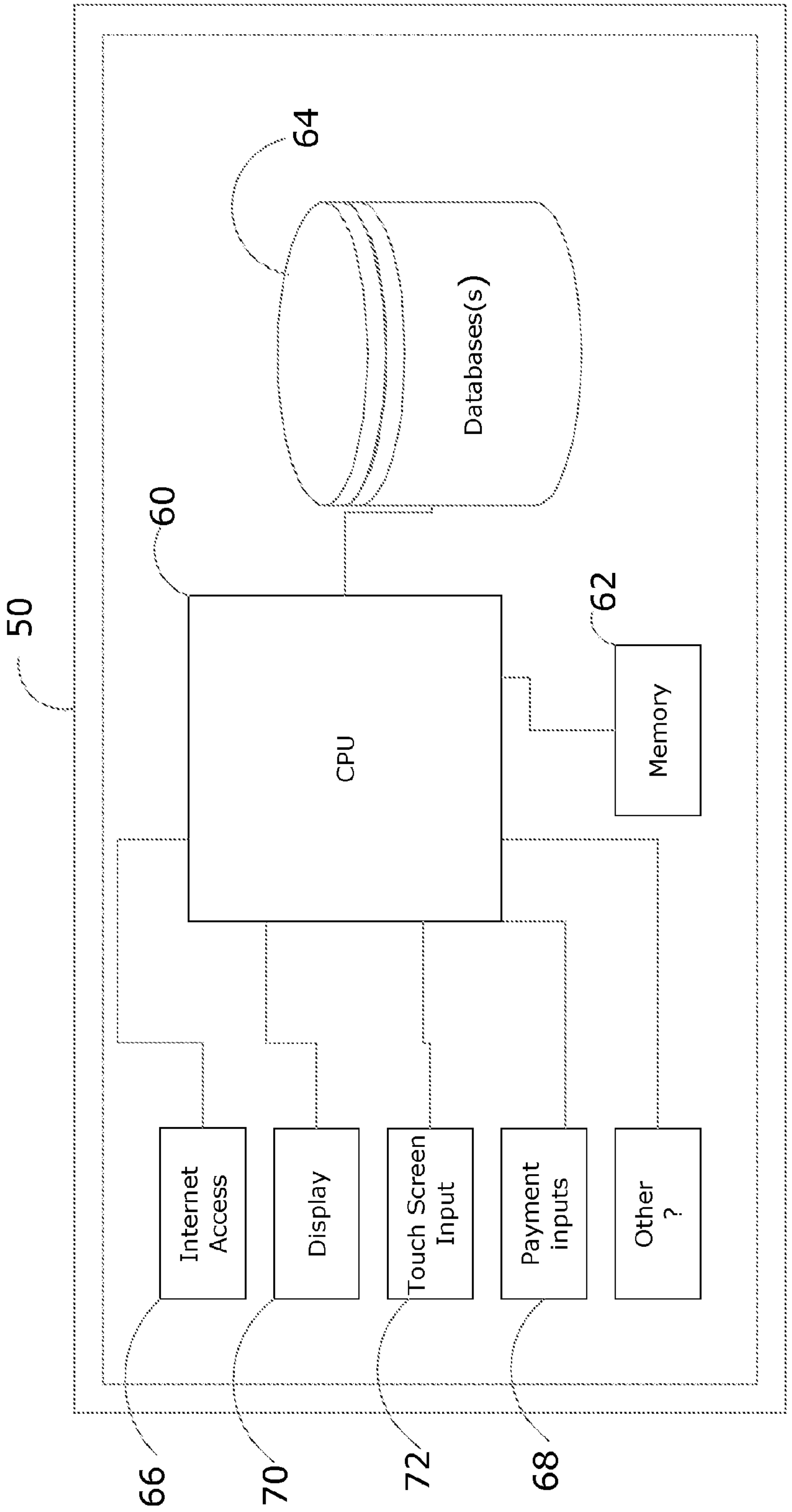
FIG. 5 is a block diagram view of an embedded microcontroller.

FIG. 5 shows in block diagram form, the microcontroller 50 control system for accomplishing the above described item viewing, selection, and delivery, method and apparatus. A central processing (CPU) module 60 has operatively connected thereto suitable memory 62; one or more data bases 64, containing the information and data needed for the supply of items to be selected; internet access means 66; payment processing means 68; and of course connections to the LED transparent touch screen units display and input means 70 and 72 respectively.. Other functions as needed can be added to the microcontroller 50 which is imbedded within the vending machine 30.

Figure 6:
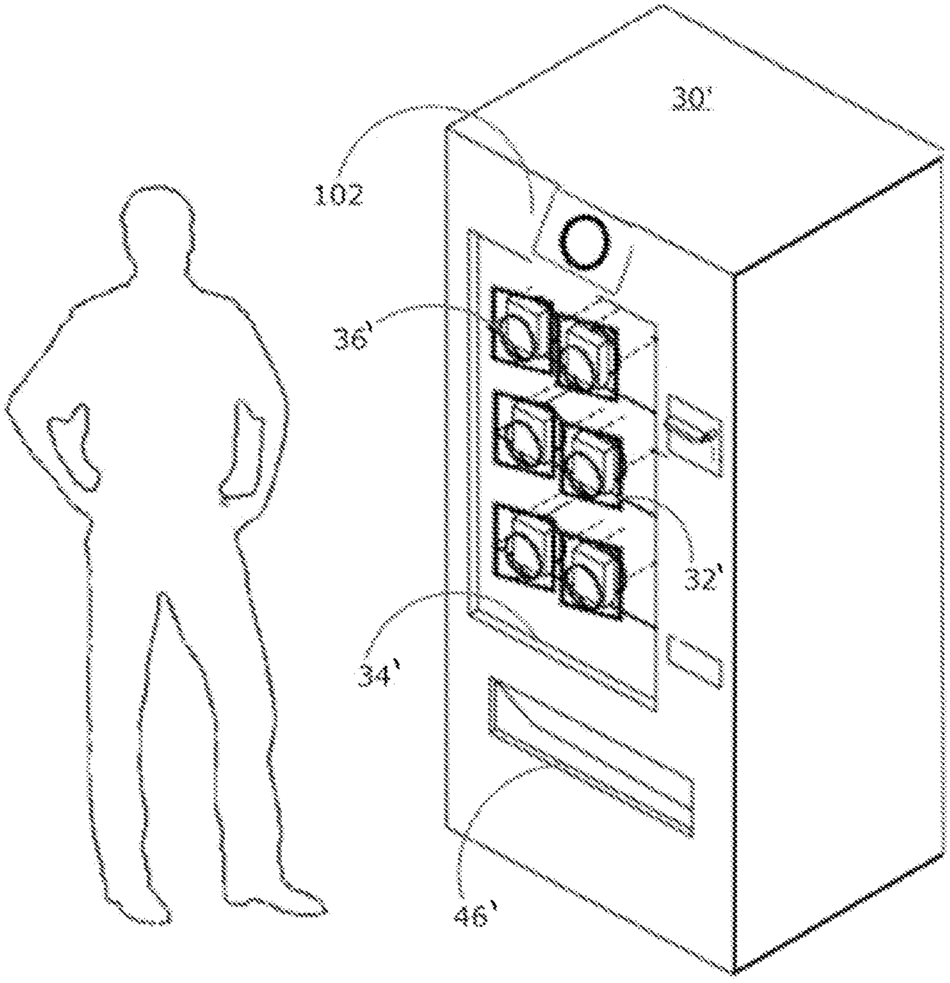
FIGS. 6 and 7 are views similar to FIGS. 3 and 4 showing another embodiment of the present invention.

Referring now to FIG. 6 vending machine 30' in addition to the transparent touchscreen units 36' is provided with, at the top of display area 34', a gesture recognition window or camera 102. Microprocessor 50 in addition to the functions shown in FIG. 5 would have the program "other" connected to the CPU 60 and gesture recognition window 102 to recognize various arm and hand motions seen by the recognition window 102 as commands to the vending machine 30' for performing the desired information gathering, product selection, compensation and dispensing functions. These motions could be unique to this application gestures, or they could be merely American Sign Language (ASL) letters to spell out a password or command. This embodiment is especially helpful for users who have various limitations or handicaps that make use of the touch screen capability difficult or inconvenient.

Figure 7:
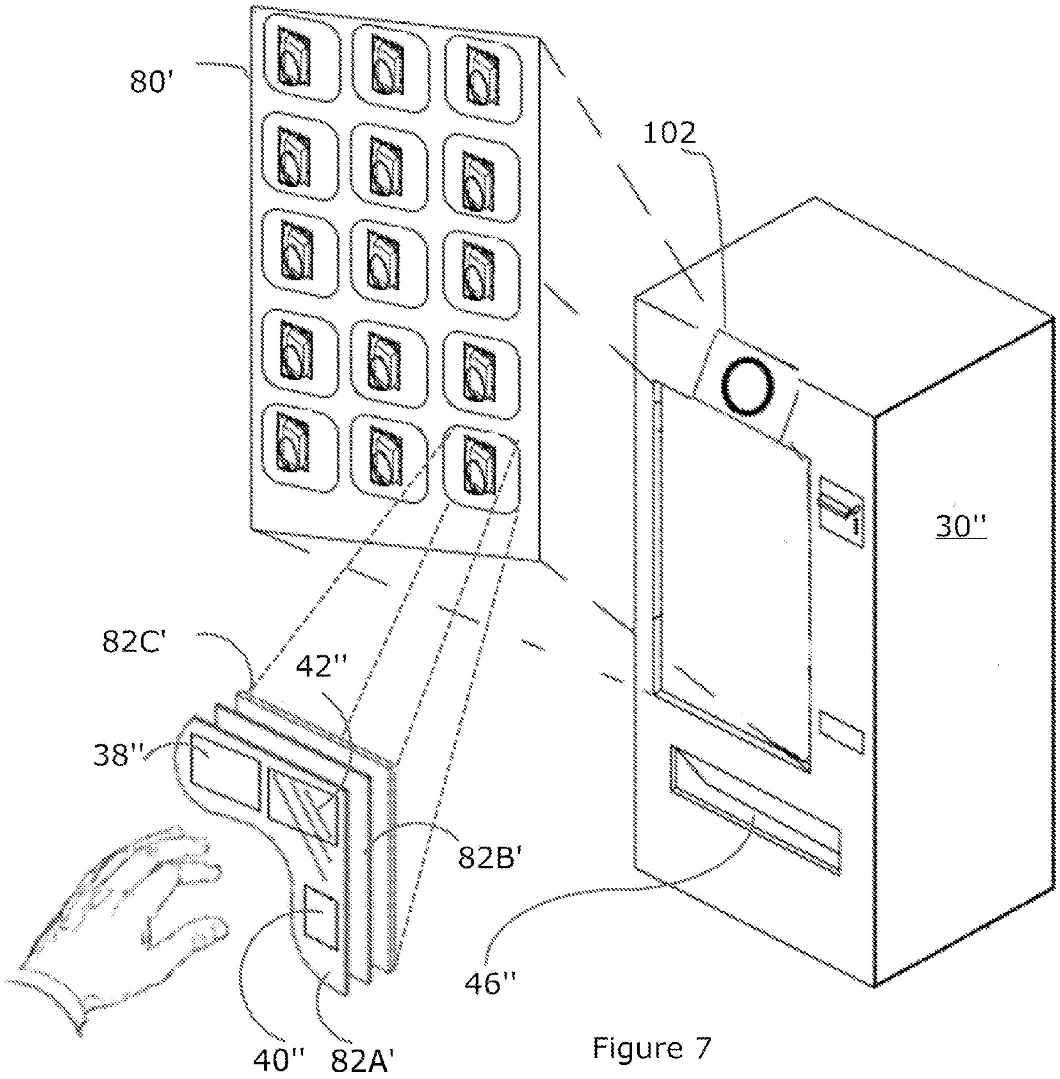

In FIG. 7 there is shown a gesture recognition unit 102' positioned at the top of display window area unit 80' in a vending machine 30" essentially the same as in FIG. 4 with touch screen 80' having display layer 82C', touch screen layer 82B', and protective layer 82A' also. This adds gesture recognition to the vending machine shown in FIG. 4 and described above.

While there are given above certain specific examples of this invention and it application in practical use, it should be understood that they are not intended to be exhaustive or to be limiting of the invention. On the contrary these illustrations and explanations herein are given in order to acquaint others skilled in the art with this invention and the principles thereof and a suitable manner of its application in practical use.

I claim:

1. Means for selecting an item from a supply of items comprising:

a supply of various items for subsequent individual selection and movement of one or more individual items from said quantity of various items;

a display area for exhibiting at least samples of said supply of various items;

transparent LED means positioned in said display area for viewing individual items of said supply of various items;

microprocessor means for providing to said transparent LED means, for display thereby, item information including identification, digital signage, stockage, and item content information;

selection means in said transparent LED means for identifying one or more of said supply of various items for further action; and microcontroller means for implementing action called for by said selection means including internet connection, payment interface, and dispensing of individual items from said supply of various items.

2. The invention as claimed in claim 1 wherein said means is a vending machine having groups of food and drink items.

3. The invention as claimed in claim 1 wherein said means is a vending machine having groups of miscellaneous items such as health and convenience articles, printer ink, safety glasses, drill bits, collectables, jewelry, diapers, cellphones, precious metals and the like.

4. The invention as claimed in claim 1 wherein said display area is a window in said enclosure through which said items may be seen.

5. The invention as claimed in claim 1 wherein said transparent LED means positioned in display area is a touch screen transparent LED.

6. The invention as claimed in claim 1 wherein said transparent LED means positioned in said display area is a touch screen transparent OLED.

7. The invention as claimed in claim 5 wherein said selection means is a finger pad in said touch screen transparent LED means.

8. The invention as claimed in claim 1 wherein said transparent LED unit positioned in said display area includes a plurality of touch screen transparent LEDs.

9. The invention as claimed in claim 8 wherein said supply of various items are displayed in rows and columns and said plurality of touch screen transparent LEDs includes one for each item column and row position.

10. The invention as claimed in claim 1 wherein said transparent LED unit positioned in said display area includes a plurality of touch screen transparent OLEDs.

11. The invention as claimed in claim 10 wherein said supply of various items are displayed in rows and columns and said plurality of touch screen transparent OLEDs includes one for viewing the items in each column and row position.

12. The invention as claimed in claim 5 wherein said transparent LED means comprises a series of touch screen transparent LED display elements positioned in said display area window in front of each of said quantity of items for visual viewing, item specific information displaying, and vending selection.

13. The invention as claimed in claim 1 wherein said micro-controller means includes means to: a) access the internet, memory, databases; b) interface with traditional forms of payment such as pliant currency acceptor, coin mechanism, magnetic card reader; c) interface with alternative payment methods such as mobile phone, smart phone, digital cash; d) interface with touch screen displays, gesture recognition and key pad and touch screen input; and e) management of the entire device.

14. A product dispensing machine configured to permit visual inspection of an item, request for and display of item information , and removal from said machine of said item upon selection and compensation therefore comprising:

an outer housing suitable for storing a quantity of items for easy discharge through a product retrieval opening;

a transparent product display window formed in said outer housing for viewing of at least the products available to be selected;

a plurality of transparent touch screen LED members fixed in said display window so as to be able to visually identify individually at least a selected item stored in said machine;

said transparent touch screen LED members having display capabilities to show information about and specifications for each corresponding item when requested;

said transparent touch screen LED members having touch screen means for requesting product data such as nutritional and allergen information, internet connection, compensation options, product dispensing, and the like;

a central processor unit (CPU) operatively connected to all said transparent LED members;

said central processor unit (CPU) also being operatively connected to suitable databases, memory, internet, compensation processors, gesture recognition means, and product dispensing means for a selected item, to enable a customer to investigate the products available, choose an appropriate item and arrange for compensation and presentation of an item to a user of said machine.

15. The method of selecting and verifying status of an item to be selected from a supply of items offered for selection which comprises :

providing means for visually inspecting an individual item in said supply of items;

displaying essential data concerning said visually inspected item, on said means for visually inspecting said item, when desired;

selecting an item by action at said means for visually inspecting an item in said supply of items;

causing accommodation to be provided for said selected item by action at said means for visually inspecting an item in said supply of items; and moving said selected item to a predetermined place.

16. The method claimed in claim 15 further including using a transparent touch screen window member for performing the visual inspection, displaying data, selecting, and accommodation functions.

17. The method as claimed in claim 15 further including using a plurality of individual transparent touch screen LED window members for viewing a corresponding plurality of items to be selected;

using an individual transparent touch screen LED member associated with a selected item to be investigated to view said item;

displaying data concerning the item being investigated on said individual touch screen LED member;

deciding to select the item being investigated by actuating a "select" pad means on said individual touch screen LED member;

completing accommodation and moving functions when an item is selected on said touch screen LED member.

18. The method as claimed in claim 15 further including using a plurality of individual transparent touch screen LED window members for viewing a corresponding plurality of items to be selected;

using an individual transparent touch screen LED member associated with a selected item to be investigated to view said item;

displaying data concerning the item being investigated on said individual touch screen LED member;

alternatively selecting another item to be investigated by actuating the individual touch screen LED member associated therewith;

causing said subsequently selected item to be ejected from said supply of items to be selected; and placing said ejected item in a dispensing location readily accessible to a user selecting an item.

* * * * *